(12) United States Patent
Binacchi

(10) Patent No.: US 8,276,639 B2
(45) Date of Patent: Oct. 2, 2012

(54) PLANT FOR PRODUCING SINGLE-DOSE CAPSULES FOR PREPARING BEVERAGES

(75) Inventor: Fabio Binacchi, Sorbolo (IT)

(73) Assignee: Opem S.p.A., Parma (IT)

( * ) Notice: Subject to any disclaimer, the term of this patent is extended or adjusted under 35 U.S.C. 154(b) by 768 days.

(21) Appl. No.: 12/388,050

(22) Filed: Feb. 18, 2009

(65) Prior Publication Data

US 2009/0211713 A1  Aug. 27, 2009

(30) Foreign Application Priority Data

Feb. 22, 2008  (IT) ............................... RE2008A0025

(51) Int. Cl.
*B29C 65/00* (2006.01)
*B65C 1/04* (2006.01)
*B65C 9/00* (2006.01)
*B32B 37/00* (2006.01)
*B32B 38/04* (2006.01)
*B32B 38/10* (2006.01)

(52) U.S. Cl. ......... 156/566; 156/443; 156/484; 156/521

(58) Field of Classification Search .................... 156/60, 156/69, 196, 212, 215, 250, 269, 270, 293, 156/294, 303.1, 304.1, 304.2, 304.5, 304.6, 156/308.2, 308.4, 308.6, 349, 350, 353, 354, 156/355, 362, 423, 443, 459, 468, 470, 471, 156/472, 473, 474, 475, 483, 484, 499, 510, 156/516, 517, 521, 538, 539, 556, 566, 567
See application file for complete search history.

(56) References Cited

U.S. PATENT DOCUMENTS

| 3,346,435 A | * | 10/1967 | Beck ............................... 156/423 |
| 4,995,310 A | | 2/1991 | Van Der Lijn et al. |
| 5,577,370 A | * | 11/1996 | Pajak et al. ...................... 53/478 |

FOREIGN PATENT DOCUMENTS

| AU | 649844 B2 | 6/1994 |
| EP | 0224297 A | 6/1987 |
| JP | 05199938 A | 8/1993 |

* cited by examiner

*Primary Examiner* — Philip Tucker
*Assistant Examiner* — Brian R Slawski
(74) *Attorney, Agent, or Firm* — Browdy and Neimark, PLLC

(57) ABSTRACT

A plant for manufacturing single-dose capsules for preparing beverages, comprising a conveyor (2) for advancing impermeable shells (101) in succession along a production line, which plant comprises at least: forming means (3) for forming individual beaker-shaped filters (105) of filtering material and for releasing each of the beaker-shaped filters (105) inside an impermeable shell (101), means for adjusting the level of each beaker-shaped filter (105) inside the relative impermeable shell (101), and welding means (5) for welding the upper edge of each beaker-shaped filter (105) to the upper edge of the impermeable shell (101) in which the beaker-shaped filter (105) is inserted.

21 Claims, 10 Drawing Sheets

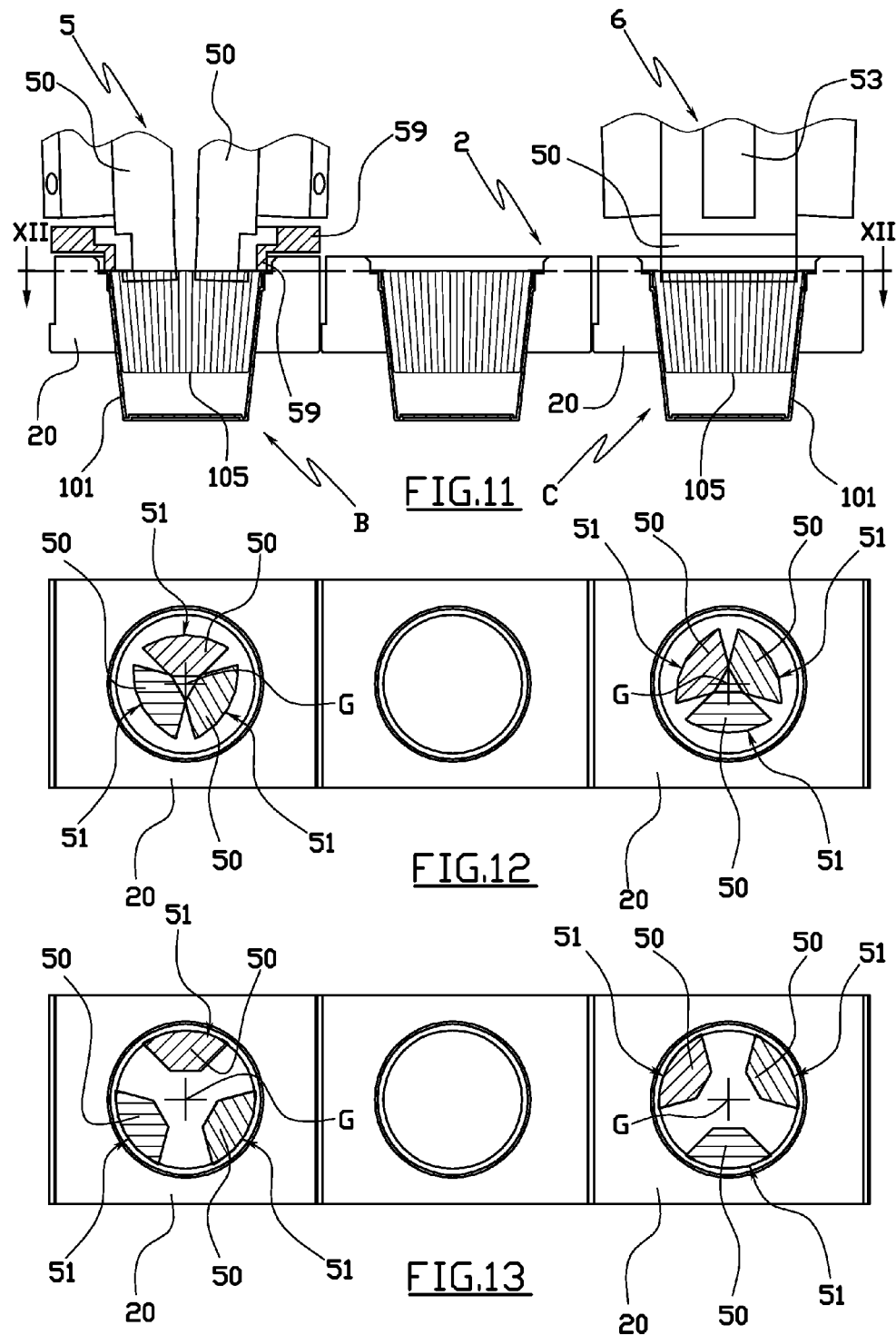

PLANT FOR PRODUCING SINGLE-DOSE CAPSULES FOR PREPARING BEVERAGES

This invention concerns a plant for manufacturing single-dose capsules destined for automatic machines for preparing beverages in single doses, typically coffee machines.

More in detail, the invention concerns a plant for manufacturing single-dose capsules of the type shown in FIGS. 1 and 2.

The single-dose capsule of the invention is denoted by reference numeral 100 in the figures and comprises a beaker-shaped external shell 101 which is made from impermeable plastic. The external shell 101 exhibits a substantially flat base 102 and an upwardly-diverging side wall 103 terminating in an upper perimetral collar 104 which delimits the mouth.

The single-dose capsule 100 further comprises a filter 105 which is made from filtering material and similarly exhibits a beaker shape, with a flat base 106 and an upwardly-diverging side wall 107.

The beaker-shaped filter 105 is coaxially received within the impermeable shell 101, to which it is welded along the entire upper border of the mouth.

In this way, the beaker-shaped filter 105 divides the internal volume of the shell 101 into two distinct chambers, an upper chamber 108 which is accessible from the mouth of the shell 101, and a lower chamber 109 which is defined between the base 106 of the filter 105 and the base 102 of the shell 101.

The side wall 107 of the filter 105 is pleated, such as as to delimit, together with the side wall 103 of the shell 101, a series of descending internal conduits which open into the lower chamber 109.

The upper chamber 108 is filled with a soluble or semi-soluble comestible substance for preparing beverages, for example a dose of ground coffee, before being closed by means of an impermeable film (not shown) which is sealed on the collar 104 of the shell 101.

During preparation of the beverage, the impermeable film is holed, in such a way as to inject hot water into the infusion chamber 108. The beaker-shaped filter 105 retains the soluble or semi-soluble substance within the infusion chamber 108, while allowing the liquid beverage to pass into the lower chamber 109, through the base 106 and/or the pleated side wall 107. The base 102 of the shell 101 is then holed, allowing the beverage to exit from the capsule 100 for serving.

An aim of this invention is to make available an automated plant which manufactures single-dose capsules of the type described above, at high production rates and with low costs.

A further aim of the invention is to achieve the above-mentioned aim within the ambit of a simple, rational and low-cost solution.

These aims are achieved by the characteristics of the invention which are disclosed in independent claim 1. The dependent claims delineate preferred and/or particularly advantageous aspects of the invention.

In general, a plant is made available comprising a conveyor which advances impermeable shells in succession along a production line, which plant comprises at least: forming means to form the individual beaker-shaped filters of filtering material and to release each of the beaker-shaped filters within an impermeable shell; means for adjusting the level of each beaker-shaped filter within the relative impermeable shell; and welding means for welding the upper edge of each beaker-shaped filter to the upper edge of the impermeable shell into which the beaker-shaped filter is inserted.

In this way, starting with already formed impermeable shells, it is possible to manufacture the single-dose capsules of the invention efficiently in a totally automated way, before sending the single-dose capsules towards the machines for filling and for closing with impermeable film.

More in detail, the means for forming the beaker-shaped filter preferably comprise means for sliding a tape of filtering material on a forming matrix, cutting means collaborating with the matrix, for cutting the tape along the perimetral edge of the matrix, such as to separate a single portion of tape, and a sliding punch, which pushes the portion of tape into a through cavity of the matrix, in such a way as to impart a beaker shape on the portion of tape, and then make the portion of tape exit from the other end of the cavity, thus releasing the portion of tape inside a relative impermeable shell.

Thanks to this solution, with a single device it is effectively possible to form the beaker-shaped filters and insert them in the relative impermeable shells, thus reducing the overall bulk of the plant and increasing productivity.

In a preferred aspect of the forming device, the sliding punch and the through-cavity of the forming matrix are both grooved, in such a way as to afford corresponding grooves in the side wall of the beaker-shaped filter, which define the above-mentioned pleating.

The cutting means preferably comprise a blade which extends annularly, is coaxial and exhibits a profile in plan view which is conjoined to the perimetral edge of the forming matrix, and activating means for obtaining a relative movement of the annular blade in an axial direction with respect to the forming matrix, the tape of filtering material being interposed.

The cutting means further comprise a tape-clamping ring, which is also coaxial with the forming matrix, and presses the tape of filtering material against a support surface which surrounds the forming matrix, such as to delimit and block the portion of tape, which will subsequently be cut, on the support surface.

In a preferred aspect of the invention, the welding means comprise at least two welding devices, which operate on impermeable shells situated at a first and a second welding station respectively along the production line.

Each welding device is configured in such a way as to weld intercalated portions of the upper edge of the beaker-shaped filter, in order to obtain overall a complete welding of the upper edge to the relative impermeable shell.

Preferably, each welding device comprises:

a plurality of heatable blocks, which are arranged around a central axis of the device, which axis coincides with the axis of the shell which is at the first or at the second welding station respectively;

activating means to obtain a relative motion of the heatable blocks in an axial direction with respect to the shell; and means for reciprocally distancing the heatable blocks from the central axis of the device, in such a way that each of the blocks pushes a portion of the edge of the beaker-shaped filter from the inside outwardly, against the shell in which the beaker-shaped filter is inserted.

The above-mentioned means for adjusting the level of the beaker-shaped filter are preferably associated to the first welding device, that is, the welding device which operates at the first welding station, and they comprise a levelling ring, which is coaxially attached to the welding device, in such a way as to push the beaker-shaped filter into the relative shell, after the relative movement of the welding device in an axial direction with respect to the shell.

Further characteristics and advantages of the invention will emerge from the following detailed description, provided by way of a non-limiting example, with the aid of the appended figures of the drawings.

FIG. 11 is an enlarged detail of the two welding devices while in operation.

FIGS. 12 and 13 are the section along XII-XII of FIG. 11 shown in two successive phases of operation of the welding devices.

Figure 1:
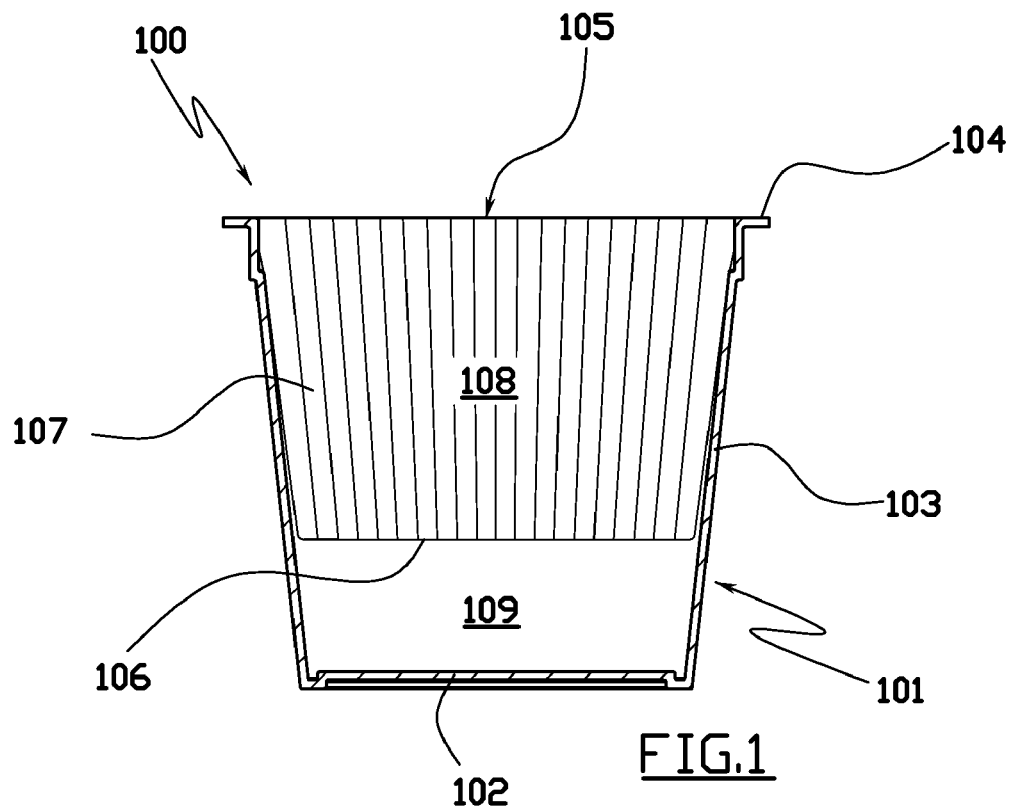
FIG. 1 is a view along section I-I of FIG. 2.
Figure 2:
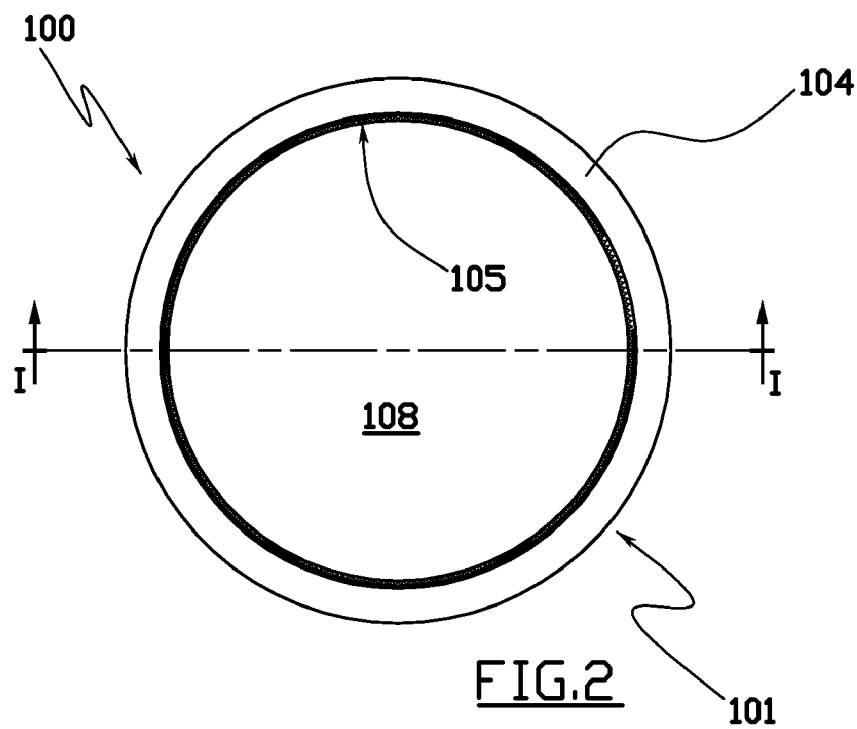
FIG. 2 is a plan view of a single-dose filter capsule obtainable with the plant of the invention.
Figure 3:
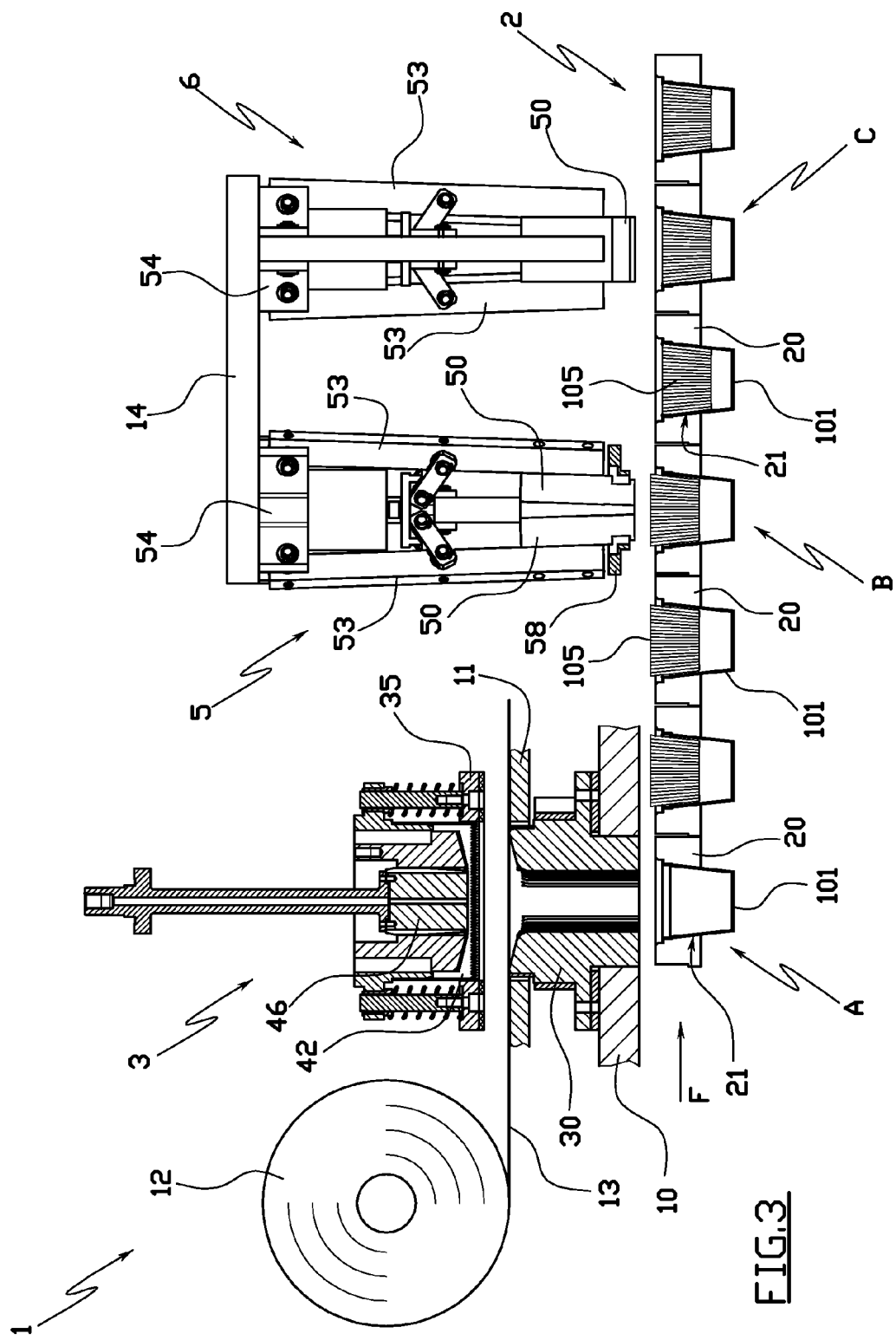
FIG. 3 is a schematic side view of the plant of the invention.

FIG. 3 shows a plant 1 for manufacturing single-dose filter capsules 100 of the type shown in FIGS. 1 and 2 and which are described in the preamble.

The plant 1 can be placed in line between a machine for forming the impermeable shells 101, and a machine for filling the infusion chamber 108 with a soluble or semi-soluble comestible substance, and for sealing them with an impermeable film.

The plant 1 comprises a linear conveyor 2, which is provided with a plurality of identical mobile apparatus 20 which are arranged in succession, and which individually convey a respective already-formed shell 101.

The mobile apparatus 20 are guided and activating to move in the direction indicated by the arrow F, by means of a known type which are neither shown nor described in detail.

Each mobile apparatus 20 is formed by a solid body, at a centre of which a receiving through-hole 21 is afforded having a vertical axis, in which through-hole 21 the shell 101 is coaxially inserted and supported.

The the apparatus 20 is shallower than the height of the shell 101, which therefore projects inferiorly from the receiving hole 21.

Figure 4:
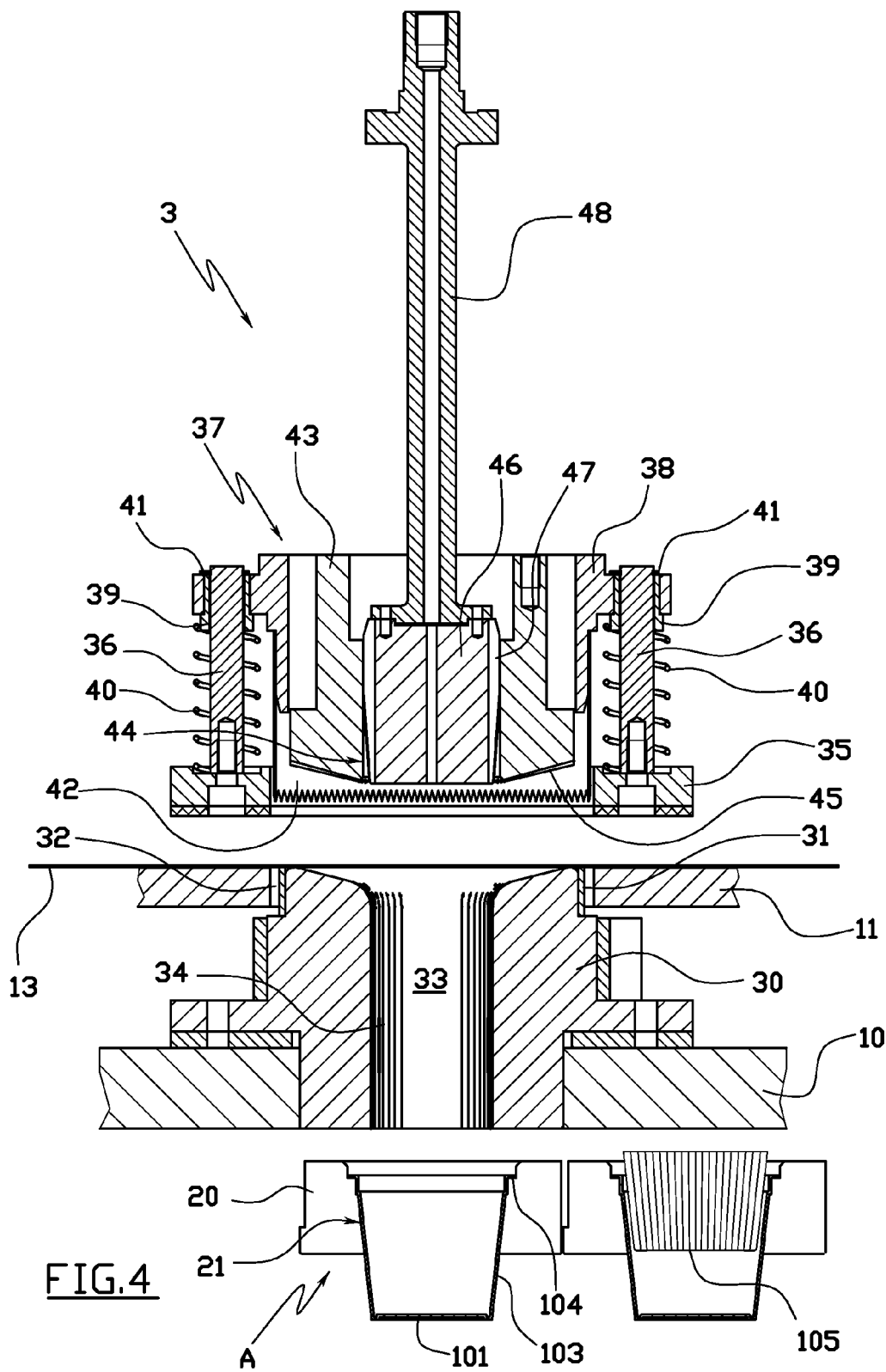
FIGS. 4 to 7 show a section view of the device for forming and inserting the beaker-shaped filter, in four operating positions while in operation.

The receiving hole 21 comprises a mouth of greater diameter, which defines an annular ledge which restingly supports the upper collar 104 of the shell 101, and a more extended lower tract, having exactly the same form and the same dimensions as the side wall 103 of the shell 101 (see also FIG. 4).

In this way, the entire upper side strip of the shell 101 is in contact with the internal surface of the receiving hole 21, which prevents the shell 101 from radially deforming outwardly.

The apparatus 20 is made to advance by steps, such as to halt each impermeable shell 101 in a plurality of operating stations which are arranged in succession along the production line.

A forming and inserting device operates in a first operating station A, which device is indicated in its entirety by reference numeral 3, and which is provided both with means for forming individual beakers 105 of filtering material, and with means for inserting each beaker-shaped filter 105 internally of the shells 101.

As shown in FIG. 4, the device 3 comprises a forming matrix 30, which is stably attached to a first fixed platform 10 which overlies the conveyor 2.

The forming matrix 30 comprises a substantially cylindrical top portion, a perimetral edge of which is delimited by a coaxial ring 31.

The top portion is coaxially received in a hole afforded in a second fixed platform 11, in such a way that a narrow annular space 32 is defined between the internal surface of the hole and the ring 31.

The upper surface of the second fixed platform 11 is flush with the top of the ring 31.

A through-cavity 33 with vertical axis is afforded at the centre of the forming matrix 30, the through-cavity 33 being coaxial both with the ring 1 and the shell 101 which is in the first operating station A.

The through-cavity comprises a truncoconical mouth which opens on the upper surface of the forming matrix 30, and a more extended cylindrical tract which extends coaxially from the bottom of the mouth until it opens on the lower surface of the forming matrix 30.

The inside surface of the cylindrical tract exhibits a plurality of longitudinal grooves 34.

The device 3 comprises means, of a known type and not illustrated, which unwind a tape 13 of filtering material from a spool 12 (see FIG. 3) and cause the material to slide on the second fixed platform 11, passing over the upper surface of the forming matrix 30.

The width of the tape 13 is greater than the diameter of the annular space 32, the tape 13 being arranged in such a way as to cover the entire perimetral edge of the forming matrix 30 and the mouth of the through-cavity 33.

The device 3 comprises a tape ring clamp 35 located above the tape 13, which is formed by two superposed metallic plates, the lower surface of which is flat and is perfectly parallel to the fixed platform 11.

The tape ring clamp 35, which is coaxial with the forming matrix 30, exhibits a central hole with a diameter which is substantially equal to a diameter of the hole of the fixed platform 11.

The tape ring clamp 35 is also associated to activating means, of known type and not shown, which move the tape ring clamp 35 in an axial direction, raising or lowering it with respect to the fixed platform 11.

Two or more vertically-extending guide columns 36 are attached to the upper side of the tape ring clamp 35, to which columns 36 a mobile group, denoted in its entirety by 37, is slidingly coupled.

The mobile group 37 comprises a sleeve 38 with a substantially cylindrical form, which is coaxial with the tape ring clamp 35, and is provided with a projecting perimetral flange which comprises a series of through holes, in which the guide columns 36 are singularly inserted.

A bush 39 made of a material having a low friction coefficient, for example brass, is interposed between each through-hole and the relative guide column 36, the bush being securely attached to the sleeve 38.

The mobile group 37 is associated to activating means, of a known type and not illustrated, which cause the mobile group 37 to slide axially and downwardly with respect to the tape ring clamp 35.

Sliding of the mobile group 37 in the opposite direction is obtained by a plurality of return springs 40, which are singly inserted on each guide column 36 and interposed between the perimetral flange of the sleeve 38 and the underlying tape ring clamp 35.

Upward sliding of the mobile group 37 is limited by a plurality of end stop Seeger rings 41, which are singly attached to the upper ends of the guide columns 36.

The mobile group 37 comprises a thin cylindrical blade 42, which is coaxially attached to the sleeve 38, from which the blade 42 projects inferiorly, terminating in a serrated lower edge which cuts the tape 13 of filtering material.

When the mobile group 37 is in the upper endrun stop position (see FIG. 4), the serrated edge of the cylindrical blade 42 is at a higher level with respect to the lower flat surface of the tape ring clamp 35.

The diameter of the cylindrical blade 42 is intermediate between the diameter of the tape ring clamp 35 and that of the ring 31 of the forming matrix 30, so that cylindrical blade 42 can slide vertically inside the tape ring clamp 35 and then be inserted into the narrow annular space 32 which is defined between the hole in the fixed platform 11 and the ring 31.

The mobile group 37 further comprises a central punch 43 of a generally cylindrical form, which is solidly attached inside the sleeve 38, and is coaxial with the cylindrical blade 42 which surrounds it.

The central punch 43 is vertically traversed by a cylindrical coaxial hole 44, an axis of which is aligned with the axis of the through-cavity 33 of the forming matrix 30.

The lower annular surface of the central punch 43 is truncoconical, which is complementary to the shape of the mouth of the through-cavity 33.

The lower annular surface comprises a plurality of frontal ribs 45, which extend radially and are arranged in a spoke arrangement about the axis of the coaxial hole 44, and are at a higher level than the serrated lower edge of the cylindrical blade 42.

The central punch 43 receives a sliding punch 46 internally of the coaxial hole 44.

The sliding punch 46 comprises a cylindrical central body, from a side surface of which a circumferential series of longitudinal ribs 47 projects, which impart a substantially grooved form to the sliding punch 46.

The longitudinal ribs 47 extend for the entire height of the punch 46 and have dimensions which allow them to be inserted in grooves 34 which are afforded in the through-cavity 33 of the forming matrix 30.

The sliding punch 46 is attached to the lower end of a support stem 48, which is associated to activating means, of a known type and not shown, which cause the punch 46 to slide vertically with respect to the central punch 43.

In operation, the tape 13 of filtering material is made to slide on the forming matrix 30 when the device 3 is in the configuration shown in FIG. 4, in which the tape ring clamp 35 is raised, the mobile group 37 is in the upper endrun stop position with respect to the tape ring clamp 35, and the lower end of the sliding punch 46 is flush with the lower annular surface of the central punch 43.

Figure 5:
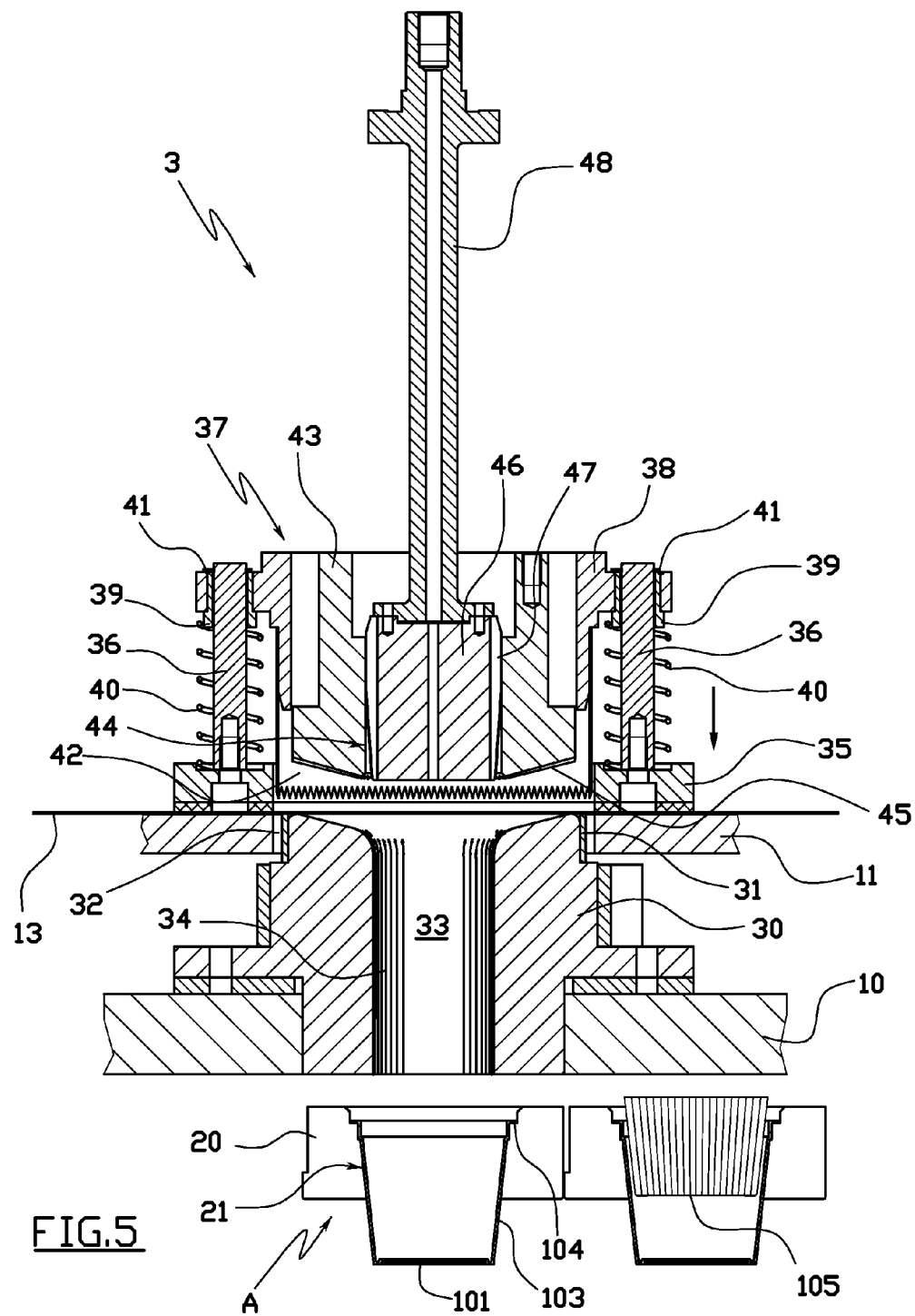

When the tape halts, the tape ring clamp 35 is lowered, together with the mobile group 37 and the sliding punch 46, until the configuration shown in FIG. 5 is reached, in which the tape ring clamp 35 presses the tape 13 of filtering material on the fixed platform, in such a way as to delimit and securely block the portion of tape 13 overlying the forming matrix 30.

Figure 6:
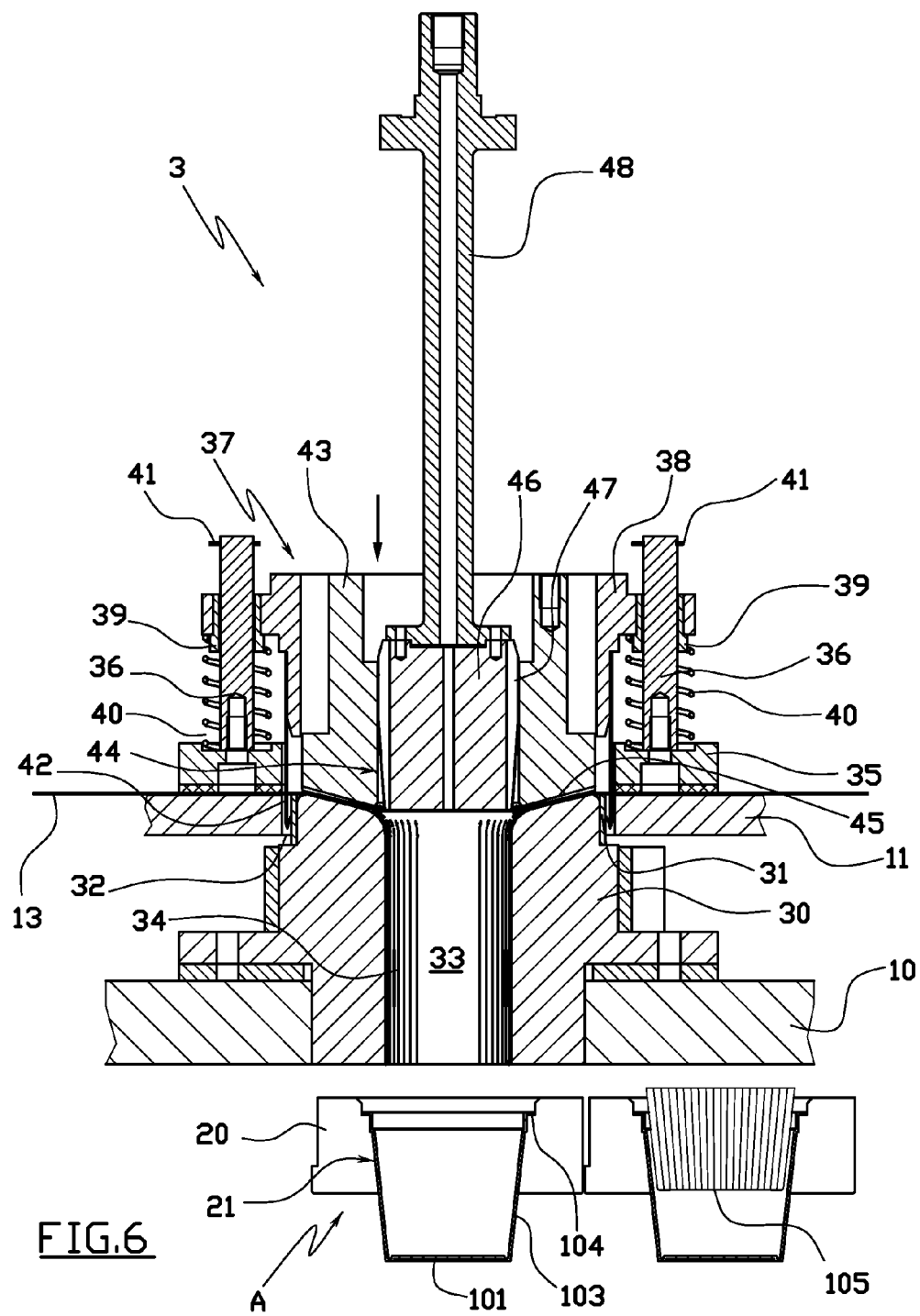

At this point, the mobile group 37 is made to move downwardly with respect to the tape ring clamp 35, thus contrasting the action of the return spring 40, until the configuration shown in FIG. 6 is reached.

During the descent, the serrated lower edge of the cylindrical blade 42 first reaches the tape 13 of filtering material and, cooperating with the ring 31 of the forming matrix 30 which acts as a reciprocating blade, cuts the tape along the perimetral edge of the forming matrix 30, in such a way as to separate a single, substantially disc-shaped portion of the tape.

Immediately after cutting, the disc of filtering material is pressed and blocked against the truncated cone-shaped surface at the mouth of the through-cavity 33 by the frontal ribs 45 of the central punch 45, thus imparting the same form to the disc.

Figure 7:
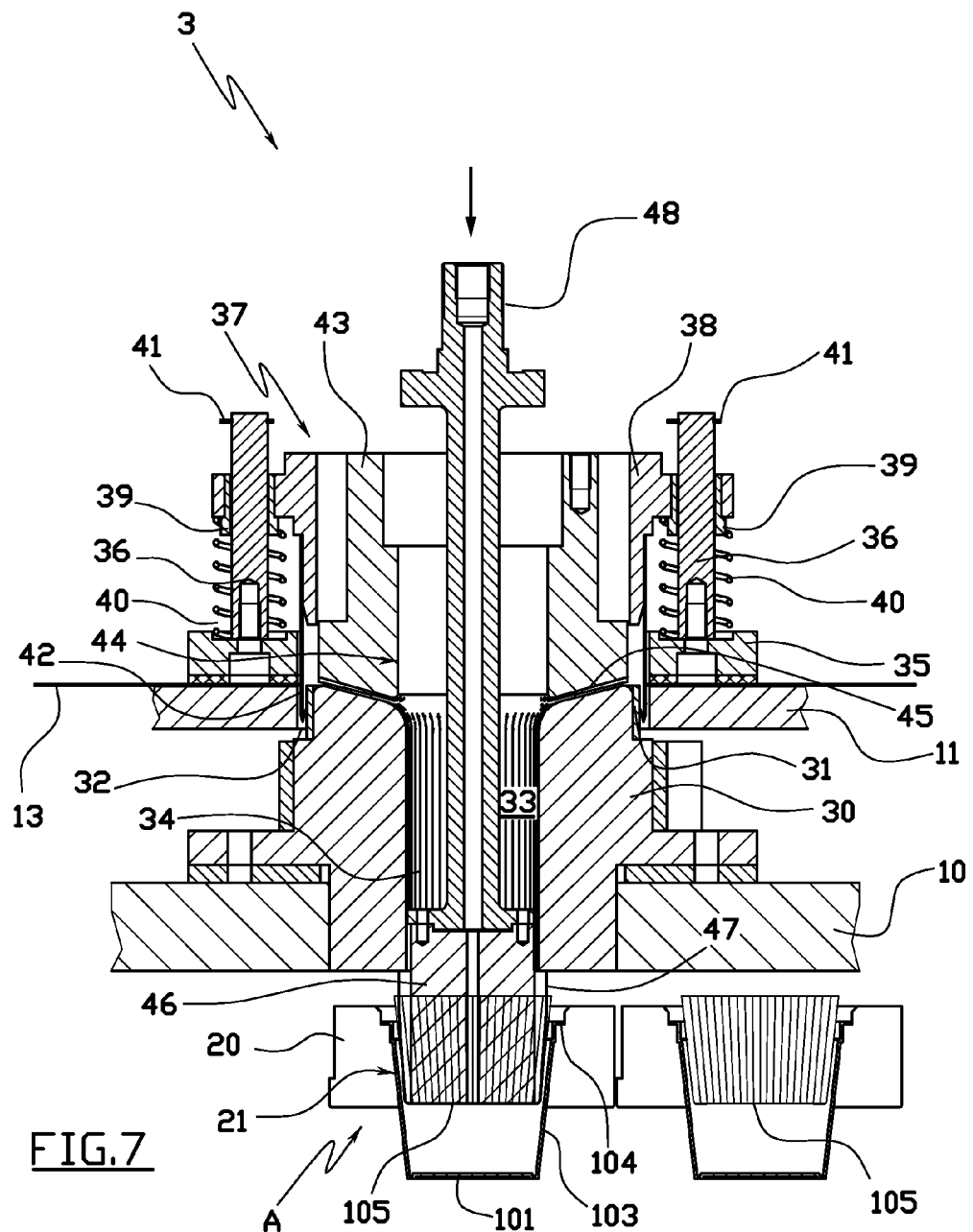

As shown in FIG. 7, the sliding punch 46 is then made to slide downwardly, firstly inside the coaxial hole 44 of the central punch 43, then in the cylindrical tract of the through-cavity 33 of the forming matrix 30, until it projects from the lower end of the forming matrix and is partially inserted into the shell 101 which is at the first operating station A.

During this downward motion, the sliding punch 46 draws the disc of filtering material with it, making the disc pass internally of the cavity 33.

In this way, the central portion of the disc of filtering material, upon which the punch 46 acts directly, remains constantly parallel, while the external crown is folded upwardly, thus giving the disc the shape of a beaker. At the same time, the projecting longitudinal ribs 47 of the punch 46 force the external crown of the disc into the grooves 34, in such a way as to give rise in the side wall of the beaker-shaped filter to corresponding grooves, thus imparting the necessary pleated form to the beaker-shaped filter 105.

Then the sliding punch 46 pushes the thus-formed beaker-shaped filter 105 out of the through-cavity 33 of the forming matrix 30, and releases it inside the underlying shell 101.

Upon termination of the insertion operation, the mobile elements of the device 3 return to the initial configuration, while the conveyor 2 advances by one step, in order to halt the following shell 101 at the first operating station A.

Downstream of the first operating station A, the conveyor 2 halts each shell 101 in a first welding station B, in which a first welding device operates, which is indicated in its entirety by 5, and which welds the upper edge of the beaker-shaped filter 105 to the inside wall of the shell 101 in which it is inserted.

Figure 8:
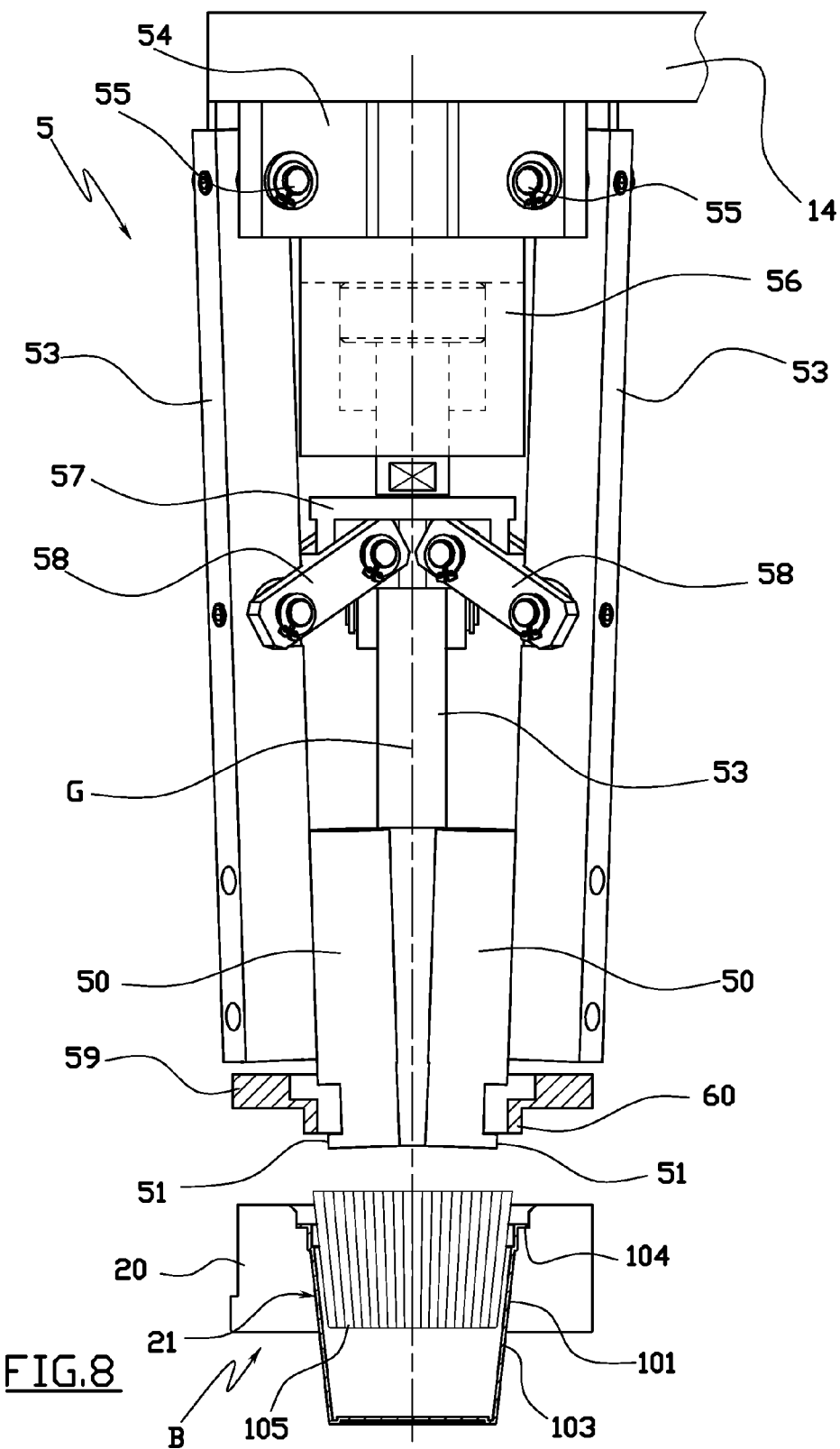
FIGS. 8 to 10 show the first welding device in three operating positions while in operation.

As shown in FIG. 8, the welding device 5 comprises three identical metal blocks 50, to which heating means are associated which are of a known type and not shown, and which adjust the temperature thereof to values suitable to cause the beaker-shaped filter 105 and the relative shell 101 to be welded together.

The heatable blocks 50 are arranged about a vertical axis G of the welding device 5, which axis is aligned with the central axis of the shell 101, which is in the first welding station B.

Each heatable block 50 comprises a lower foot, which exhibits a lateral outwards-facing contact surface 51, the cross-section of which exhibits an arc-shaped profile (see FIG. 12).

The radius of curvature of the arc is substantially the same as the radius of the mouth of the shell 101, and covers an angle of approximately 70 ° at the centre.

The contact surfaces 51 of the heatable blocks 50 are all positioned at the same height and are radially equidistant from the vertical axis G of the welding device 5, with respect to which they are also angularly equidistant from one another, that is, they are reciprocally staggered by about 120°.

The heatable blocks 50 are attached to the lower end of a respective support arm 53, an opposite end of which is hinged to a base 54 arranged at a higher level with respect to the heatable blocks 50.

The hinging axes of the support arms 53 with the base 54 lie in the same horizontal plane, are equidistant from the vertical axis G of the device, and are angularly staggered with respect to the device by about 120°, in such a way that the rotation of each support arm 53 about the relative hinging axis corresponds to a radial shift of the corresponding heatable block 50 with respect to the vertical axis G.

In more detail, each support arm 53 is embodied by a prismatic bar, the lower end of which is attached to the outer side of the relative heatable block 50, while the upper end is inserted between the two parallel plates of the base 54, to which it is fixed by a transverse pin 55.

The support arms 53 are activated by a single hydraulically-powered cylinder-piston 56, which is attached under the base 54, the axis of the piston coinciding with the vertical axis G of the welding device 5.

The outer end of the piston bears a cursor 57 to which three identical connecting rods 58 are hinged.

Each connecting rod 58 has a first end which is hinged to a vertical wall extending radially from the cursor 57, while the second end is hinged at an intermediate point of a relative support arm 53.

The hinging axes of the connecting rods 58 to the slide 57 lie in a same horizontal plane, are equidistant from the vertical axis G of the device, and are angularly distanced from one another by about 120°.

Similarly, the axes of hinging of the connecting rods 58 with the respective support arms 53 lie in a same horizontal plane, are equidistant from the vertical axis G of the device, and are angularly staggered by about 120°.

In this way, an axial shift of the slide 57 due to the action of the cylinder-piston group 56 corresponds to equal shifts of the connecting rods 58, which in turn engage the support arms 53 to effect same rotations about the relative axes of hinging with the base 54.

The welding device 5 is rigidly attached to an upper bar 14, which is associated to activating means, of known type and therefore not shown, which lower and raise the entire welding device 5 with respect to the shell 101 at the first welding station B.

The welding device 5 further comprises a levelling ring 59, the axis of which coincides with the vertical axis G of the device, which levelling ring 59 surrounds the heatable blocks 50, such as to leave the lower feet projecting inferiorly.

The welding device 59 is constrained to the base 54 by rigid connecting means (not shown) which fix it solidly to the welding device 5, without interfering with the radial movement of the heatable blocks 50.

In particular, the levelling ring 59 comprises a lower shank 60 which is inserted in the receiving hole 21 of the mobile apparatus 20.

The external and internal diameters of the lower shank 60 are respectively larger and smaller than the diameter of the mouth of the shell 101, such that the levelling ring 59 pushes the beaker-shaped filter 105 downwardly.

In operation, each shell 101 reaches the first welding station B when the welding device 5 is in the configuration shown in FIG. 8, in which the heatable blocks 50 are raised and distanced with respect to the shell 101 on the conveyor 2.

In this configuration, the cylinder-piston group 56 is in a minimum length configuration, such that the heatable blocks 50 are sufficiently close to one another to be inserted inside the shell 101.

Figure 9:
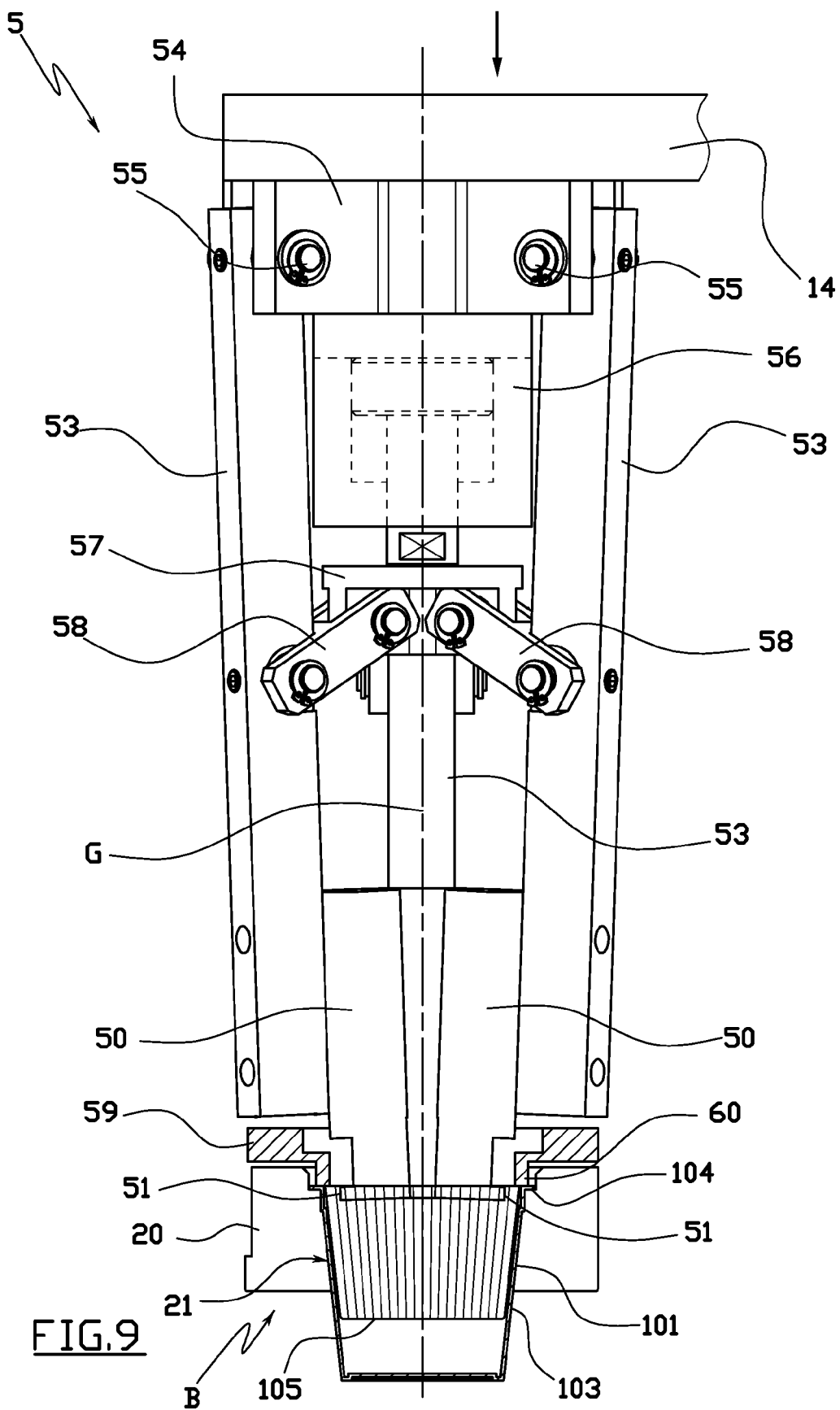

The welding device 5 is lowered until the position shown in FIG. 9 is reached, in which the lower shank 60 of the levelling ring 59 rests on the upper collar 104 of the shell 101.

During the descent, the lower shank 60 initially comes into contact with the upper edge of the beaker-shaped filter 105, and then pushes it downwardly into the shell 101 until it is flush with the collar 104.

From this configuration, the cylinder-piston group 56 is extended lengthwise such as to move the slide 57 downwardly, thus causing the connecting rods 58 and the support arms 53 to rotate around the respective hinging axes thereof, and giving rise to the contemporaneous distancing of the heatable blocks 50 with respect to the vertical axis G of the welding device.

Figure 10:
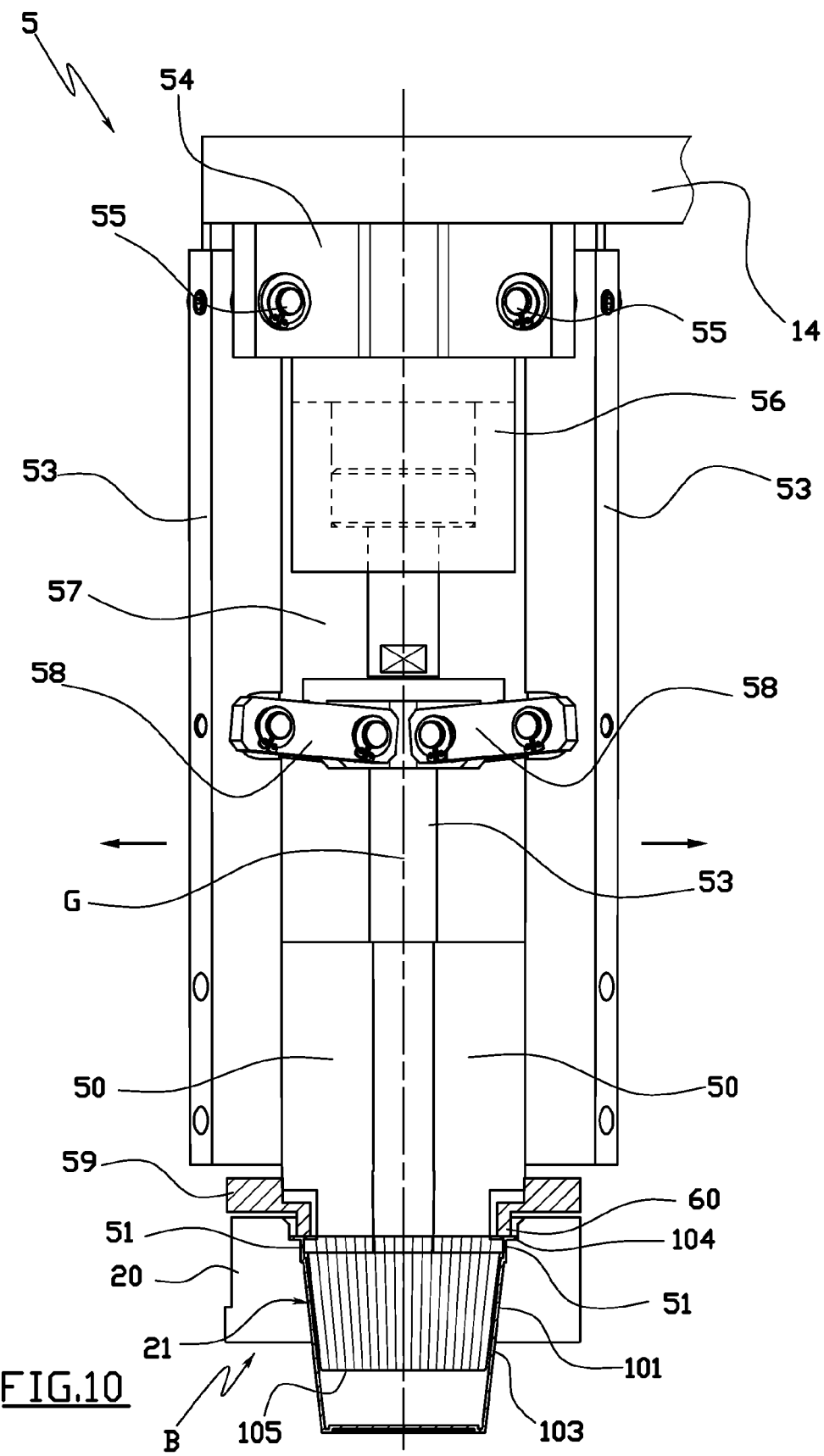

During the separating operation, the heatable blocks 50 travel equal distances, always remaining equidistant from the vertical axis G, until they contemporaneously reach the configuration shown in FIG. 10.

In this configuration, the contact surfaces 51 of the heatable blocks 50 press the edge of the beaker-shaped filter 105 against the side wall of the shell 101, with the inside wall of the receiving hole 21 acting as a contrast surface, and then weld the portions of the beaker-filter 105 with which they are in direct contact to the shell 101.

As shown in FIG. 13, contact takes place when the surfaces 51 are at a distance from the vertical axis G which is equal to their own radius of curvature, that is, when they are aligned on a circumference which is centred in the vertical axis G and exhibits the same diameter as the diameter of the mouth of the shell 101.

In this way, contact takes place along the entire extension of the lateral surfaces 51, which lateral surfaces 51 therefore cause welding of three distinct arcuate portions of the beaker-filter 105, each of which subtends an angle of 70° at the centre and is staggered by about 120° with respect to the others.

When welding is terminated, the cylinder-piston group 56 recalls the slide 57 upwardly, such as to move the heatable blocks 50 closer together again before the welding device 5 has been raised, and to return to the initial configuration.

Downstream of the first welding station B, the conveyor 2 halts each shell 101 at a second welding station C, where a second welding device 6 is in operation.

The second welding device 6 is functionally and constructionally identical to the first welding device 5 described previously, from which it differs only in two aspects.

A first aspect consists of the fact that the welding device 6 is not provided with a levelling ring 59.

The second aspect consists in the fact that the assembled position of the second welding device is rotated by about 600 about its vertical axis G, with respect to the assembled position of the first welding device 5 (see FIGS. 12 and 13).

In this way, the contact surfaces 51 of the second welding device weld the portions of the beaker-filter 105 which were not welded by the arcuate surfaces of the first, thus obtaining complete welding of the perimetral edge of the beaker-shaped filter 105 to the relative shell 101.

Note that choosing to have lateral contact surfaces 51 with an angular extension of 70° means that the portions welded by the second welding device 6 partially overlap those welded by the first device 5, thus ensuring complete welding of the edge of the beaker-filter 105, even if the shell 101 were to undergo tiny rotations about its own axis, during travel from the first welding station B to the second welding station C.

Preferably, the second welding device 6 is attached to the same transversal bar 14 to which the first welding device 5 is attached, so that both may operate contemporaneously.

Obviously a person skilled in the art could introduce numerous modifications of a technical and applicational nature to the plant described herein above, without forsaking the ambit of the invention as claimed herein below.

The invention claimed is:

1. A plant for manufacturing single-dose capsules for preparing beverages, comprising:
   a conveyor (2) for advancing impermeable shells (101) in succession along a production line, the production line comprising:
   a first operative station (A) comprising a forming unit (3) for forming individual beaker-shaped filters (105) made of a filtering material and a releasing unit for partially inserting each of the formed beaker-shaped filters (105) inside an impermeable shell (101); and a second operative station (B,C) disposed downstream from the first operative station (A) comprising:
    a regulating unit (59, 60) for regulating a level of each partially inserted beaker-shaped filter (105) inside the relative impermeable shell (101) and pushing the beaker-shaped filter (105) to slide into the shell (101), said regulating unit being independent from the forming unit; and
    a welding unit welding an upper edge of each beaker-shaped filter (105) to an upper edge of the impermeable shell (101) in which the beaker-shaped filter (105) is inserted.

2. The plant of claim 1, wherein the forming unit (3) comprises a device causing a tape (13) of a filtering material to pass onto a forming matrix (30), a cutting unit (42), collaborating with the forming matrix (30), for cutting the tape (13) along a perimetral edge of the forming matrix (30) to separate a single portion of the tape (13) from the tape, and a sliding punch (46) which pushes the portion of tape (13) internally of a through-cavity (33) of the matrix (30), such as to impart a beaker shape on the portion of tape (13) and cause the portion of tape (13) to exit from an opposite end of the cavity (33), such as to release the portion of tape (13) internally of a relative impermeable shell (101).

3. The plant of claim 2, wherein the sliding punch (46) and the axial through-cavity (33) of the forming matrix (30) are both grooved, such as to give rise to corresponding grooves in a side wall of the beaker-shaped filter (105).

4. The plant of claim 2, wherein the cutting unit comprises a blade (42) having an annular development which is coaxial and which in plan view exhibits a profile which complements a profile of the perimetral edge of the forming matrix (30), and a first activating unit for obtaining a relative movement of the annular blade (42) in an axial direction with respect to the forming matrix (30), with interposing of the tape (13) of filtering material.

5. The plant of claim 2, wherein the cutting unit (42) comprises a tape ring clamp 35 which is coaxial to the forming matrix (30), and which pushes the tape (13) of filtering material against a support surface (11) which surrounds the forming matrix (30), such as to delimit and block the portion of tape (13) to be separated on the support surface (11), and an activating unit for obtaining a relative movement in an axial direction of the tape ring clamp 35 with respect to the support surface (11).

6. The plant of claim 4, wherein the annular blade (42) is attached to a support body (43), which support body (43) is coupled to the tape ring clamp (35) by means which allow relative movements thereof in an axial direction.

7. The plant of claim 6, wherein the support body (43) comprises a through hole (44), a second activating unit for obtaining a relative movement of the sliding punch (46) in an axial direction with respect to the support body (43).

8. The plant of claim 6, wherein the support body (43) comprises a truncoconical surface which pushes the tape (13) of filtering material into a truncoconical depression situated at a mouth of the through-cavity (33) of the forming matrix (30).

9. The plant of claim 1, wherein the welding unit comprises at least two welding devices (5, 6), which respectively operate in a first welding station (B) of said second stations and a second welding station (C) of said second stations, the second welding device being disposed downstream of the first welding device, each welding device (5, 6) welding different portions of the upper edge of the beaker-shaped filter (105), such as in combination to obtain a complete welding of the edge.

10. The plant of claim 9, wherein the welding devices (5, 6) weld at least partially-overlapping portions of the edge of the beaker-shaped filter (105).

11. The plant of claim 9, wherein each welding device (5, 6) comprises a plurality of heatable blocks (50), which are arranged around a central axis (G) of the device, aligned with the axis of the shell (101) which is situated in the first welding station or the second welding station (B, C) respectively, a third activating unit for obtaining a relative movement of the heatable blocks (50) in an axial direction with respect to the shell (101), and a unit for reciprocally distancing the heatable blocks (50) with respect to the central axis (G), in such a way that each of the heatable blocks (50) pushes a portion of the beaker-shaped filter (105) from inside and outwardly against the shell (101) in which the beaker-shaped filter (105) is inserted.

12. The plant of claim 11, wherein each heatable block (50) exhibits an outwardly-facing contact surface (51) a cross-section of which is an arc of circumference profile having a radius of curvature substantially equal to a radius of the mouth of the shell (101).

13. The plant of claim 11, wherein the heatable blocks (50) are angularly equidistant with respect to the central axis (G) of the welding device.

14. The plant of claim 11, wherein the means for distancing are configured in such a way as to move the heatable blocks (50) while always maintaining the heatable blocks (50) equidistant from the central axis (G) of the welding device.

15. The plant of claim 11, wherein the unit for distancing comprise a plurality of support arms (53), each of which exhibits an end attached to a respective heatable block (50), and an opposite end hinged to a base (54) with an axis of hinging which is perpendicular to the central axis (G) of the welding device, and a fourth activating unit to cause the support arms (53) to oscillate contemporaneously about respective axes of hinging.

16. The plant of claim 15, wherein the fourth activating unit comprises a plurality of connecting rods (58), each of which exhibits an end which is hinged to an intermediate point of a respective support arm (53) and an opposite end which is hinged to a single connecting body (57), which is activated by an actuator (56) to move along the central axis (G) of the welding device.

17. The plant of claim 16, wherein the actuator (56) comprise a cylinder-piston group (56).

18. The plant of claim 11, wherein the unit for adjusting a level of the beaker-shaped filter (105) are associated to the first welding device (5) which operates in the first welding station (B), and comprise a levelling ring (59, 60) which is solidly attached to the first welding device (5), and which coaxially surrounds the relative heatable blocks (50), which levelling ring (59, 60) pushes the beaker-shaped filter (105) internally of the impermeable shell (101), following a relative movement of the first welding device (5) in an axial direction with respect to the shell (101).

19. The plant of claim 5, wherein the annular blade (42) is attached to a support body (43), which support body (43) is coupled to the tape ring clamp (35) by means which allow relative movements thereof in an axial direction.

20. The plant of claim 19, wherein the support body (43) comprises a through hole (44), a fifth activating unit for obtaining a relative movement of the sliding punch (46) in an axial direction with respect to the support body (43).

21. The plant of claim 19, wherein the support body (43) comprises a truncoconical surface which pushes the tape (13) of filtering material into a truncoconical depression situated at a mouth of the through-cavity (33) of the forming matrix (30).

* * * * *